US010473485B2

(12) United States Patent
Cantaloube

(10) Patent No.: US 10,473,485 B2
(45) Date of Patent: Nov. 12, 2019

(54) AIRCRAFT PILOT ASSISTANCE SYSTEM

(71) Applicant: THALES, Courbevoie (FR)

(72) Inventor: Christian Cantaloube, Toulouse (FR)

(73) Assignee: Thales, Courbevoie (FR)

( * ) Notice: Subject to any disclaimer, the term of this patent is extended or adjusted under 35 U.S.C. 154(b) by 195 days.

(21) Appl. No.: 15/852,356

(22) Filed: Dec. 22, 2017

(65) Prior Publication Data

US 2018/0180444 A1    Jun. 28, 2018

(30) Foreign Application Priority Data

Dec. 23, 2016   (FR) ..................................... 16 01854

(51) Int. Cl.
*G01C 23/00*   (2006.01)
*G06F 3/0488*   (2013.01)
(Continued)

(52) U.S. Cl.
CPC ......... *G01C 23/005* (2013.01); *G05D 1/0077* (2013.01); *G06F 3/0488* (2013.01);
(Continued)

(58) Field of Classification Search
CPC ..... B64C 39/02; B64C 39/024; G01C 23/005; G01C 23/00; G01C 21/00; B64D 45/00; B64D 2045/0085; B64D 47/08; G08G 5/0013; G08G 5/0021; G08G 5/00; G08G 5/0052; G08G 5/0039; G08G 5/0069; G08G 5/006; G08G 5/025; G08G 5/0017; G08G 5/0078; G08G 5/045; G05D 1/102;
(Continued)

(56) References Cited

U.S. PATENT DOCUMENTS

2007/0164166 A1   7/2007  Hirvonen
2011/0035149 A1   2/2011  McAndrew et al.
(Continued)

FOREIGN PATENT DOCUMENTS

WO   WO 2010/103233 A1   9/2010

OTHER PUBLICATIONS

Search Report dated Sep. 13, 2017, in French Patent Application No. 16 01854.

*Primary Examiner* — Behrang Badii
(74) *Attorney, Agent, or Firm* — Knobbe, Martens, Olson & Bear, LLP

(57) ABSTRACT

An aircraft pilot assistance system is disclosed. In one aspect, the system includes at least one primary chain and at least one secondary chain. Each chain can include a plurality of interconnected electronic modules, the primary and secondary chains differing from one another by at least one electronic module. Each chain can be configured at least to retrieve pilot assistance information and to implement at least one of the following avionics functions: automatic piloting, flight plan management and trajectory development, and alert generation in case of malfunction of the aircraft or in case of detection of at least one risk on the trajectory. The primary chain can be configured to operate according to a nominal pilot assistance information retrieval mode, and the secondary chain can be configured to operate according to a downgraded mode in which the information from the nominal mode is partially retrieved.

10 Claims, 4 Drawing Sheets

(51) Int. Cl.
  *G05D 1/00*  (2006.01)
  *G08G 5/00*  (2006.01)
  *B64D 45/00*  (2006.01)

(52) U.S. Cl.
  CPC ... *G08G 5/0021* (2013.01); *B64D 2045/0085* (2013.01); *G08G 5/00* (2013.01); *G08G 5/0052* (2013.01)

(58) Field of Classification Search
  CPC .. G05D 1/0077; G05D 1/0088; G05D 1/0202; G05D 1/106; G05D 1/101; G05D 1/12; G01S 13/878; G01S 7/021; G01S 19/13; G01S 13/913; G06F 3/0488; G06Q 10/08355; G10L 15/01; G10L 15/30; G10L 25/72; G10L 15/265
  See application file for complete search history.

(56) References Cited

U.S. PATENT DOCUMENTS

| | | | |
|---|---|---|---|
| 2011/0276199 A1 | 11/2011 | Brot | |
| 2014/0002280 A1* | 1/2014 | He | G05D 1/102 340/946 |
| 2014/0081484 A1* | 3/2014 | Covington | G08G 5/02 701/16 |
| 2014/0249701 A1* | 9/2014 | Latsu-Dake | G08G 5/0052 701/14 |
| 2016/0155435 A1* | 6/2016 | Mohideen | G08G 5/0013 704/235 |
| 2017/0132566 A1* | 5/2017 | High | B64C 39/024 |

\* cited by examiner

AIRCRAFT PILOT ASSISTANCE SYSTEM

CROSS-REFERENCE TO RELATED APPLICATION(S)

This patent application claims the benefit under 35 U.S.C. § 119 of French Application No. FR 16 01854 filed on Dec. 23, 2016 which is hereby incorporated by reference in its entirety.

BACKGROUND

Technological Field

The described technology relates to the field of avionics systems on board aircraft, and in particular pilot assistance systems comprising at least one chain for at least one retrieval of pilot assistance information.

Description of the Related Technology

To pilot and control an aircraft, it is essential for the crew to know certain flight parameters of the aircraft.

An aircraft pilot assistance system chain implements avionics functions. An avionics function is for example the computation of flight parameters as a function of measurement signals provided by sensors, the development of control signals for actuators of the aircraft as a function of flight parameters and/or trajectory setpoints, the recording of flight parameters for maintenance, the display of flight parameters on a viewer, for example in the cockpit of an aircraft, etc.

SUMMARY OF CERTAIN INVENTIVE ASPECTS

The flight parameters of an aircraft in particular comprise parameters relative to the air (or air references) and parameters relative to the ground (or inertial references), and are retrieved by one or several pilot assistance system chain(s).

The parameters relative to the air for example comprise the calibrated airspeed (CAS), the true airspeed (TAS), the Mach number, the vertical speed, the angle of attack (AOA), the sideslip angle, the static pressure, the air temperature.

The parameters relative to the ground for example comprise the attitude angles (roll, pitch), the heading, the roll, pitch and yaw angular speeds and angular accelerations, the acceleration and the ground speed.

Different types of aircraft pilot assistance systems are known comprising at least two pilot assistance chains.

A first chain generally implements two sets of technologically identical pilot assistance equipment respectively dedicated to the pilot and copilot. Although redundancy in case of failures is thus provided, these two chains are respectively made up of the same types of electronic components, and a design or production flaw in one of the types of electronic components may cause them to be lost completely.

The second pilot assistance chain, called secondary chain (or standby chain), is intended to be used in case of failure of primary pilot assistance chain(s), such as the primary chain(s) previously described, and respectively dedicated to piloting in nominal mode.

Such a backup chain comprises an integrated electronic standby instrument (JEST). Such an electronic standby instrument is connected to pressure measuring probes, comprises or is connected to a set of accelerometers and gyrometers, and comprises a computer to compute a set of anemobarometric and inertial parameters from measurements delivered by the probes and sensors. This electronic standby instrument is also connected to (or incorporates) a viewer to retrieve the obtained set of anemobarometric and inertial parameters. The standby heading is provided by an autonomous standby compass or a geomagnetic field sensor connected to the IESI.

Nevertheless, the set of parameters obtained by this electronic standby instrument traditionally comprises a number of flight parameters smaller than that of the sets of flight parameters computed by the primary chain(s) used in nominal mode. The size of the viewer associated with this electronic standby instrument is further reduced, equal to within plus or minus 10% to a size of three inches by three inches.

Thus, if the primary chain fails, the current secondary chain implements a limited number of avionics functions and the retrieval of the set of vital flight parameters for piloting is uncomfortable for a crew already in a tense situation faced with such a failure of the primary chain.

One of the aims of the described technology is to propose an improved pilot assistance system making it possible to facilitate piloting by the crew even if the primary chain fails.

To that end, the described technology relates to an aircraft pilot assistance system, comprising at least one primary chain and at least one secondary chain, each chain comprising a plurality of interconnected electronic modules, the primary and secondary chains differing from one another by at least one electronic module, each chain being configured at least to retrieve pilot assistance information and to implement at least one avionics function belonging to the group comprising:

automatic piloting, flight plan management and trajectory development, alert generation in case of malfunction of the aircraft or in case of detection of at least one risk on the trajectory, the primary chain being configured to operate according to a nominal pilot assistance information retrieval mode, and the secondary chain being configured to operate according to a downgraded mode in which the information from the nominal mode is partially retrieved.

A "risk" refers to a collision risk of the aircraft related to coming excessively close to the ground or an obstacle, or related to traffic conditions during the flight, or related to a weather phenomenon.

According to specific embodiments, the pilot assistance system comprises one or more of the following optional features:

the primary chain and the secondary chain are each associated with separate criticality levels (DAL), the secondary chain being associated with a more demanding criticality level (DAL) than the criticality level (DAL) associated with the primary chain, the secondary chain is configured to:

be activated in case of malfunction of the primary chain, or operate in parallel with the primary chain, the size of the viewing screen(s) of the primary chain is equal to or larger than the size of the viewing screen(s) of the secondary chain, the screen diagonal(s) of the secondary chain being greater than or equal to six inches, in each chain, at least one electronic module screen is touch-sensitive and/or is configured to be connected to a pointing device, the pilot assistance system further comprises a tertiary chain configured to operate according to a pilot assistance information retrieval enhancement mode comprising at least one additional item of pilot assistance information and separate from the pilot assistance information of the nominal mode or the downgraded mode, the primary, secondary and tertiary chains differing in pairs by at least one electronic module, at least two separate chains are configured to be connected by a secure communication link, one of the at least two chains configured to be connected by a secure communication link comprises an electronic module configured to execute a setpoint received from the other chain, the secondary chain further comprises an electronic module for entering pilot instructions, at least one chain is reconfigurable in case of malfunction of another chain.

BRIEF DESCRIPTION OF THE DRAWINGS

The described technology and its advantages will be better understood upon reading the following description, provided solely as a non-limiting example, and done in reference to the appended drawings, in which.

DETAILED DESCRIPTION OF CERTAIN INVENTIVE EMBODIMENTS

Figure 1:
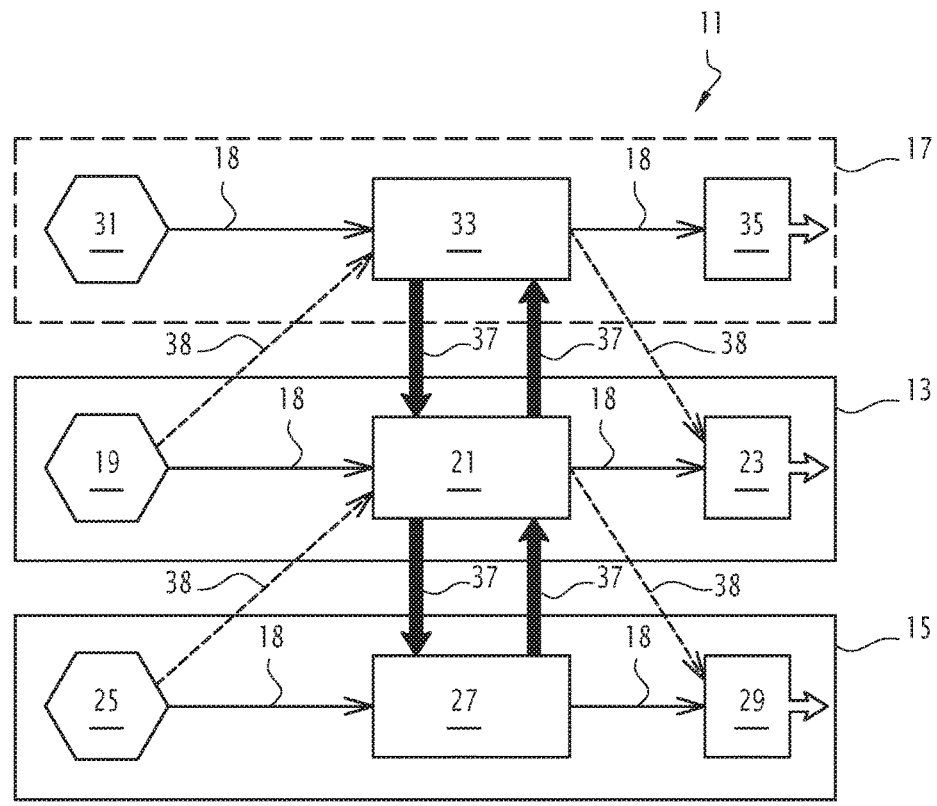
FIG. 1 is a schematic view of a pilot assistance system comprising a primary, secondary and tertiary pilot assistance chain.

The on board pilot assistance system 11 according to the example embodiment of FIG. 1 comprises three electronic pilot assistance chains, a primary chain 13, a secondary chain 15, an optional tertiary chain 17 (shown in dotted lines), each configured at least to retrieve pilot assistance information for an aircraft crew.

Each chain 13, 15, 17 is associated with its own operating mode.

The primary chain 13 is configured to operate according to a nominal pilot assistance information retrieval mode. In other words, by default, the primary chain is primarily used.

The secondary chain 15 is configured to operate according to a downgraded pilot assistance information retrieval mode. According to this downgraded retrieval mode, the information from the nominal mode is partially retrieved. In other words, according to this partial pilot assistance information retrieval mode, compared with the nominal retrieval mode, there is less retrieved pilot assistance information, and/or the retrieved pilot assistance information is less precise. Furthermore, the secondary chain 15 is configured to be activated in case of malfunction of the primary chain 13 or to operate in parallel with the primary chain 13, additionally or by way of cross-verification.

The primary 13 and secondary 15 chains are therefore configured to provide overlapping avionics functions making it possible to offset any failure of one or the other of them.

When the secondary chain 15 operates in parallel with the primary chain 13, it is configured to carry out the same avionics functions continuously and independently of the operation (good or bad) of the primary chain 13.

The tertiary chain 17 is optional and configured to operate according to an enhanced pilot assistance information retrieval mode. According to this retrieval enhancement mode, at least one additional item of pilot assistance information separate from the pilot assistance information of the nominal mode or the downgraded mode is retrieved.

In other words, each chain is configured to determine flight parameters, according to its specific operating mode, and to broadcast them, in real time, toward on board electronic output modules, using the flight parameters to perform avionics functions allowing the piloting and/or control of the aircraft.

Furthermore, according to the described technology, each chain can be activated/deactivated manually by a crew member and/or automatically in case of failure of one of the primary 13, secondary 15 or tertiary 17 chains during operation.

To that end, a chain, for example the primary chain 13, is made up of a plurality of electronic modules, interconnected within the primary chain by wired or wireless communication links 18, and distributed into three sets, i.e., a set 19 of primary sensors, a set 21 of primary computers and a set 23 of output modules comprising primary viewers or actuators or transmitters.

The secondary chain 15 is also made up of a set 25 of secondary sensors, a set 27 of secondary computers and a set 29 of output modules comprising secondary viewers or actuators or transmitters.

Among the functions performed in parallel by the electronic modules of the primary chain 13 and the secondary chain 15, there is necessarily according to the described technology a display of flight parameters in the cockpit intended for the pilots and at least one avionics function belonging to the group comprising:

automatic pilot configured to command the engines and the control surfaces of the aircraft (keeping a setpoint trajectory, generally simple)

flight plan management (programming and tracking of a complex trajectory from takeoff to landing)

alert generation in case of malfunction of the aircraft or in case of detection of at least one risk on the trajectory.

A "risk" refers to a collision risk of the aircraft related to coming excessively close to the ground or an obstacle, or related to traffic conditions during the flight, or related to a weather phenomenon near the aircraft.

Such a risk is assessed using a property representative of the risk incurred by the aircraft, such a property for example being:

the position of a potential intersection of the aircraft's trajectory and the ground determined by a dedicated avionics function of the TAWS (Terrain Awareness and Warning System) type, the position of a potential collision with another aircraft determined by a dedicated avionics function of the TCAS (Traffic Alert and Collision Avoidance System) type, a meteorological alert level determined by a weather monitoring module, the weather monitoring module being on board the aircraft.

Thus, relative to the traditional standby chain, the secondary chain 15 is enhanced and able to carry out additional "upgraded" avionics functions relative to the mere retrieval of a set of vital flight parameters such as attitude, altitude, heading and speed, etc.

However, in order to avoid any catastrophic flaw during aircraft piloting, the primary 13 and secondary 15 chains are designed such that they differ from one another by at least one electronic module, for example by a computing processor or by a viewer.

In other words, to carry out an identical action (for example, to display), two electronic modules of the same type (for example, two viewers) have at least one difference in hardware and/or software design (for example the screen or power supply technology) between the primary chain 13 and the secondary chain 15.

Furthermore, similarly, the tertiary chain 17 is also made up of a set 31 of tertiary input data receivers, a set 33 of tertiary computers and two sets 35 of output modules comprising tertiary viewers or actuators or transmitters, the primary 13, secondary 15 and tertiary 17 chains differing in pairs by at least one type of electronic module.

Thus, the secondary chain 15 is able to carry out one or several additional avionics function(s) relative to the current standby chain, which makes it possible to increase the comfort and safety of the crew in case of general failure of the primary chain, the secondary chain being technologically separate from the primary chain.

In other words, relative to the current standby chain, the secondary chain 15 according to the described technology is configured to allow less downgrading of the retrieval of pilot assistance information.

Furthermore, the primary 13, secondary 15 and tertiary 17 chains are respectively associated with criticality (i.e., integrity) levels (DAL; Development Assurance Level) that differ from one chain to the next. In particular, the secondary chain 15 is for example associated with the maximum criticality level (DAL A) making it possible to guarantee maximum operating safety. The primary chain 13 is associated with a criticality level that is less demanding than that of the secondary chain 15 while retaining an acceptable impact on flight safety (DAL B or C). Lastly, the optional tertiary chain 19 is associated with a less demanding criticality level (DAL D or E) than that of the primary chain, and having no effect on flight safety.

Furthermore, in the on board pilot assistance system 11 of FIG. 1, the primary chain 13 is configured to be connected via one or several secure communication links 37 to the secondary chain 15 or to the tertiary chain 17.

Optionally, the secondary chain 15 is also configured to communicate via a secure communication link 37 (not shown) with the tertiary chain 17.

To that end, each primary 13, secondary 15 and tertiary 17 chain respectively comprises one or several transmission/reception electronic m odul e(s) dedicated to secure data exchanges, via the secure communication links 37, with another chain.

Such a secure communication 37 from one chain to the other makes it possible to ensure operating continuity between chains (passing adjustment or background parameters, for example) while avoiding undermining the integrity of a chain from data coming from another chain with a less demanding criticality level.

The secure communication 37 between two chains of the pilot assistance system of FIG. 1 is for example used to:
load a flight plan in the primary chain 13 developed and optimized in the tertiary chain 17,
store and resume the performance in the secondary chain 15 of a flight plan initially performed by the primary chain 13 when the primary chain 13 becomes faulty,
provide data available in the primary 13 or secondary 15 chain to the tertiary chain 17 to feed its enhancement and/or optimization processing operations.

Furthermore, optionally, to increase the availability of an avionics function without deterioration of its integrity, optional communication links 38 (dotted lines) make it possible to connect:
sensors of one chain to computers of another chain, preferably from highest integrity to lowest integrity, and
computers of one chain to electronic output modules (comprising viewers or actuators) of another chain, preferably from lowest integrity to highest integrity.

Alternatively, a data supply link, not shown, from an electronic module with lower integrity of one chain to an electronic module with higher integrity of another chain is carried out as long as the obtained deterioration remains below a predetermined threshold.

Figure 2:
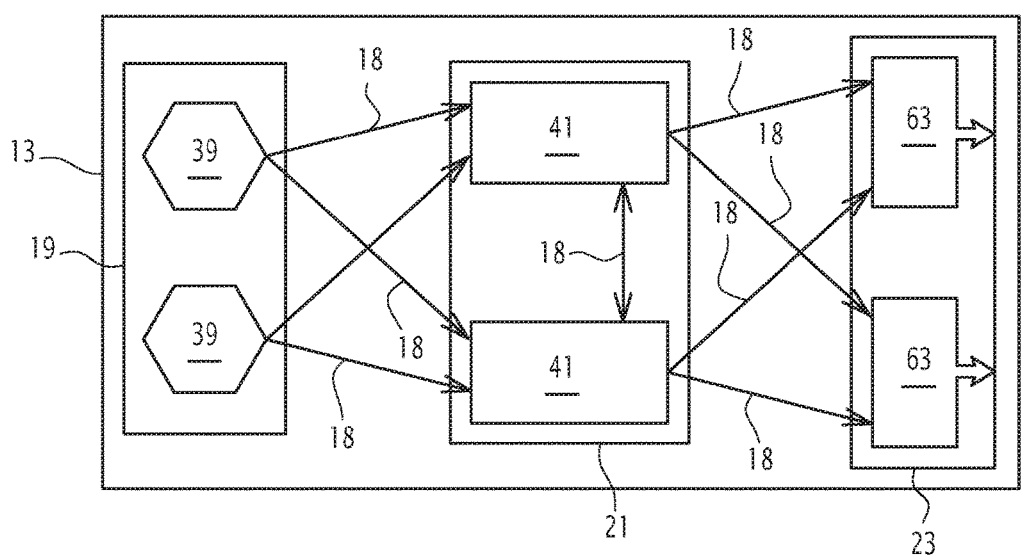
FIG. 2 is a schematic view of the primary chain of FIG. 1.

An example configuration of the primary chain 13 is outlined in FIG. 2.

The primary chain 13 is configured to carry out, according to the nominal operating mode, a maximum number of avionics functions relative to the secondary chain 15 and the tertiary chain 17.

To that end, the set 19 of primary sensors of the primary chain 13 in particular comprises two identical subsets 39 of redundant sensors, two identical subsets 41 of computers, two identical subsets 63 of viewers or actuators to ensure the availability of the avionics functions (for example for the pilot and copilot), the processing power and the intrinsic proper operation of the primary chain 13.

According to other embodiments, the number of redundancies of the various elements is greater than two in order to offer the required functionality and performance levels, which would be unachievable with the technology available in a single physical entity.

Each subset 39 of primary sensors for example comprises:
flight parameter sensors relative to the air, such as anemobarometric units for determining angles, altitude and speed,
flight parameter sensors relative to the ground such as an inertial unit, for example of the gyrolaser type,
environment sensors (terrain, weather, traffic) delivering situation images,
radio-navigation sensors, of the DME (Distance Measuring Equipment) type,
radio receivers: VHF, Transponder
control stations available to the pilot (button, keyboard), optionally physically connected to the viewers.

The set of primary sensors 19 is connected to the set of primary computers 21.

According to the example of FIG. 2, the set of primary computers 21 comprises two identical primary computers 41 in order to process the flight parameters provided by the two subsets of primary sensors 39, respectively.

Figure 3:
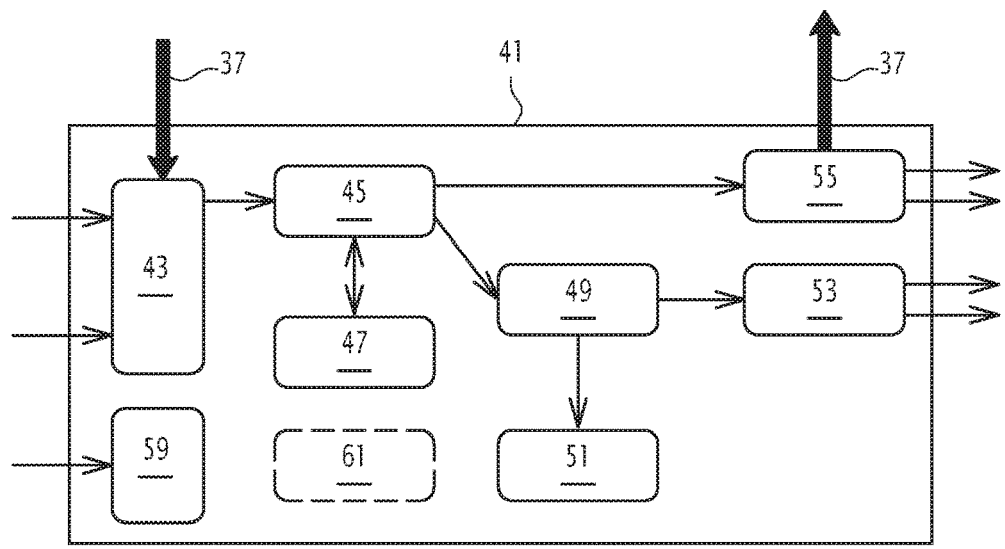
FIG. 3 is a schematic view outlining the general structure of a computer of a primary, secondary or tertiary chain of FIG. 1.

The general structure of a primary computer 41 is shown in FIG. 3.

In FIG. 3, such a primary computer 41 generally comprises an electronic reception module 43 configured to receive the data provided by the set of primary sensors 19 and the data or instructions provided by the other secondary 15 or tertiary 17 chains via the secure communication links 37.

Optionally, the electronic module 43 for receiving data or instructions provided by the other secondary 15 or tertiary 17 chains via the secure communication links 37 comprises an integrity verification tool (coherence, likelihood, safety) of the data received from other secondary 15 or tertiary 17 chains.

The electronic receiving module 43 provides the received data to a CPU (Central Processing Unit) 45 configured to perform computations from this data and/or to carry out instructions received from the other secondary 15 or tertiary 17 chains. The CPU 45 of a primary computer 41 is a high-performance processor, for example a Freescale® MPC 8610 or Freescale® processor from series P20 with one or several computing cores (Freescale® P2010, Freescale® P2020, Freescale® P2040 etc.).

The CPU 45 communicates with a memory 47 dedicated to it for example comprising a volatile RAM (Random Access Memory) and a non-volatile ROM (Read Only Memory), each for example being 1 GB, associated with a mass memory from 16 GB to 256 GB, for example.

The CPU 45 is also connected to a GPU (Graphics Processing Unit) 49. The GPU 49 is connected to a dedicated graphics memory 51 and, via a graphics/video data transmission module 53, to a viewer of the primary set of electronic output modules 23 shown in FIG. 1. The GPU is also able to process graphics/video inputs, received via the electronic receiving module 43.

Furthermore, the CPU 45 is also connected to a secure electronic transmission module 55, configured to provide data delivered by the CPU 45 to the other downstream equipment (for example, the primary set of electronic output modules 23) and to the secondary 15 or tertiary 17 chains via the secure communication links 37.

To supply electricity to the set of electronic modules that it contains, the computer 41 comprises a low-voltage power source 59.

Furthermore, a primary computer 41 optionally comprises (as shown in dotted lines) an internal electronic module 61 for local monitoring of the proper basic operation of at least one component of the primary computer 41.

Indeed, according to the described technology, the primary chain 13 is associated with a less demanding criticality level than the criticality level of the secondary chain 15, which makes it possible to limit the number of electronic modules dedicated to monitoring the processing done by the primary computers 41.

Thus, relative to the traditional primary chains comprising at least one monitoring channel, the primary chain is "lightened" by offloading this criticality to the secondary chain.

Furthermore, if electrical flight commands are implemented, modules for computing these electrical flight commands (not shown) are optionally physically integrated into the primary avionics computers 41.

Within the primary chain 13 shown in FIG. 2, the set of primary computers 21 is configured to send the data to be retrieved to the crew via the primary set of electronic output modules 23.

In particular, according to a nominal mode, the primary chain 13 is able to process and retrieve, via the electronic output modules 23, pilot assistance information such as flight parameters, air/ground communication information, navigation and flight trajectory information, abnormal and emergency alerts and procedures.

According to FIG. 2, to ensure avionics implementation redundancy, the primary set 23 of electronic output modules comprises two primary subsets 63 of identical electronic output modules.

Each primary set 23 of electronic output modules for example comprises:

viewers, the number of which varies, for example, from one to four, and the screen diagonal of which is preferably comprised between fourteen and twenty inches. Such primary viewers for example use AMLCD viewer technologies, include a touch-sensitive designating device, for example capacitive technology, and/or are connected to a pointing device, i.e., the cursor control device is a trackball, a touchpad, or a mouse, and/or optionally, elementary viewers (indicators) on control stations, and/or optionally, actuators (control column or lever actuators at the output of the automatic pilot), and/or optionally, transmitters configured to transmit via data links to downstream systems, such as the electrical flight commands (not shown).

wireless transmitters.

The avionics functions performed by this primary chain 13 are:

automatic pilot, to maintain the attitude, altitude, speed, slope, heading, route, and also to follow an ILS (Instrument Landing System) or GLS (Global Positioning Landing System) (category 1 precision approach, for example)

flight plan management and development of a complex trajectory with predictions and optimization of the flight in terms of time or fuel, for example, for instance a RNP (Required Navigation Performance) trajectory with a low to medium precision class (no stricter than 0.3 nm, for example). Such a management module is also able to use a trajectory provided via the secure communication links 37, by another chain, for example the tertiary chain 17, and display of flight parameters and engines of the aircraft, alert generation in case of malfunction of the aircraft or in case of detection of at least one risk on the trajectory, management of audio communications and air-ground data links via air/ground communication modules associated with the primary chain 13 (not shown), monitoring of the environment (weather, traffic, obstacles), airport navigation assistance, adjustment of the electronic output modules 63, for example, by using an adjusting capability directly integrated in each electronic output module 63.

Figure 4:
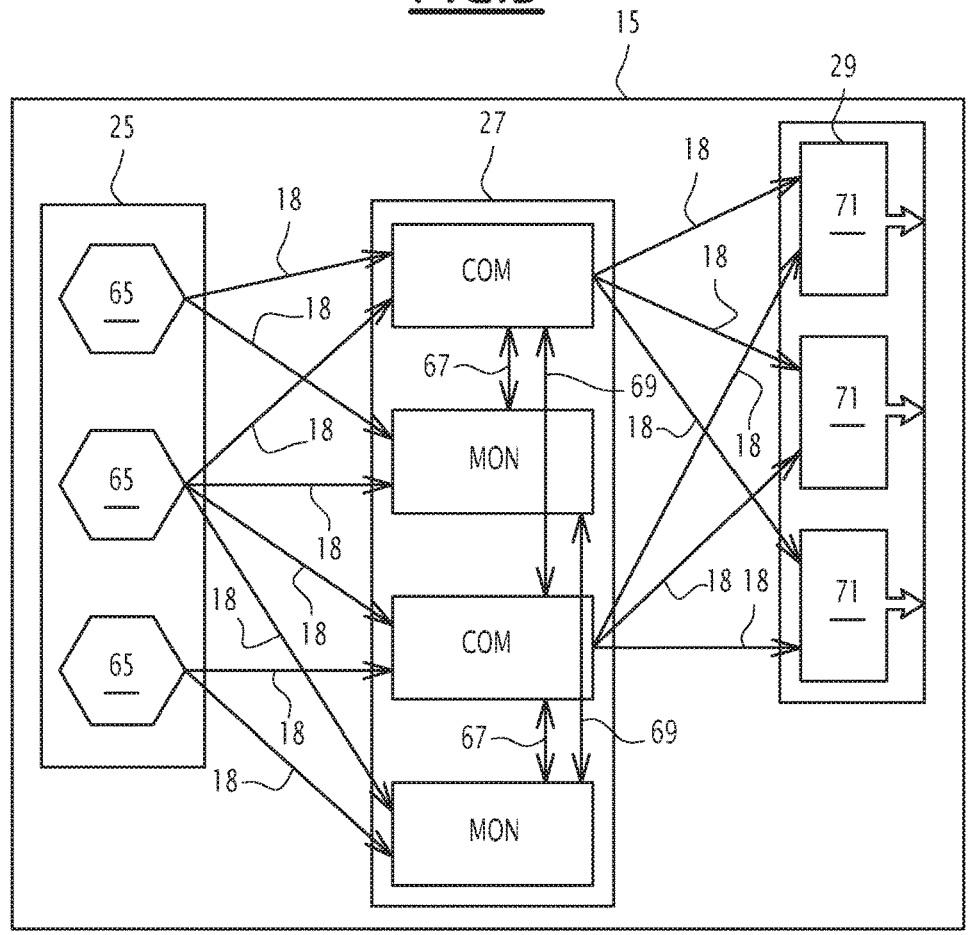
FIG. 4 is a schematic view of the secondary chain of FIG. 1.

An example configuration of the secondary chain 15 is outlined in FIG. 4.

According to the described technology, the secondary chain 15 is dissimilar in terms of technological design with respect to the primary chain 13. Such a dissimilarity is for example implemented on one or several levels of the secondary chain 15, namely at the set 25 of secondary sensors, at the set 27 of secondary computers and at the secondary set 29 of electronic output modules.

The secondary chain 15 is configured to carry out a moderately downgraded operating mode in which the information from the nominal mode of the primary chain 13 is partially retrieved.

In other words, the secondary chain 15 is able to implement the essential functions not only in terms of retrieval of the vital flight parameters for piloting, but also in terms of minimum piloting comfort with one or several of the upgraded avionics functions belonging to the group comprising automatic pilot, flight plan management, alert generation in case of malfunction of the aircraft or if at least one risk is detected on the trajectory.

Furthermore, the secondary chain 15 is associated with the maximum criticality level (DAL A) making it possible to guarantee maximum operating safety. To that end, the secondary chain 15 comprises at least a control pathway COM and a monitoring pathway MON.

The monitoring pathway MON is configured to monitor the control pathway COM in order to guarantee the highest integrity level.

The monitoring pathway MON performs the same processing operations as the control pathway COM, from the same inputs, and compares the output result with that of the control pathway COM. In case of divergence, an alert is generated and the outputs are for example inhibited. In another alternative embodiment, the pathway MON acquires the results of the pathway COM, performs the inverse function and compares the result to its own acquisition of the same inputs.

The offloading of the monitoring pathway from the primary chain 13 to the secondary chain 15 makes it possible to lighten the primary chain 13, the criticality level (DAL) of which is less demanding than that of the secondary chain 15, and the complexity level of which is higher relative to the secondary chain 15.

According to the example of FIG. 4, the secondary chain 15 comprises two duplicated control pathways COM and two duplicated monitoring pathways MON to ensure the availability of the implemented avionics functions.

As an alternative (not shown), to guarantee maximum availability and safety, instead of two redundant pairs of control and monitoring pathways, three control pathways and one voting device are implemented.

The set 25 of secondary sensors of the secondary chain 15 for example comprises several identical subsets 65 of redundant sensors to ensure availability and integrity verification.

Each secondary set 25 of sensors for example comprises:

flight parameter sensors relative to the air, such as anemo-barometric units for determining altitude, airspeed, flight parameter sensors relative to the ground such as a heading and attitude unit, for example based on inertial sensors of the MEMS (Micro-Electro-Mechanical Systems) type, radio-navigation sensors, of the VOR (Vertical Omnidirectional Range) or ILS (Instrument Landing System) type, and/or a radio altimeter, a geo-positioning module of the aircraft, for example GNSS (Global Navigation Satellite System).

control stations available to the pilot (button, keyboard), optionally physically connected to the viewers.

The set of secondary sensors 25 is connected to the set of secondary computers 27.

The set of secondary computers 27 comprises two identical control computers COM and two identical monitoring computers MON. In other words, a secondary control computer COM is paired with a secondary monitoring computer MON in particular using a pairing communication link 67. Furthermore, the two identical control computers COM communicate via a redundancy communication link 69, and the two identical monitoring computers MON also communicate via a redundancy communication link 69.

The general structure of a secondary control computer COM or a secondary monitoring computer MON is identical to that of the computer of FIG. 3 described in connection with the primary chain 13, except that the electronic modules (computing, memory, power supply, etc. components), making up a secondary computer 41, are technologically separate (in terms of hardware design and/or in software design language) from the electronic modules 43, 45, 47, 49, 51, 53, 55 and 59 making up a primary computer 41.

A secondary computer 27 comprises an electronic reception module configured to receive the data provided by the sets of redundant secondary sensors 65 and the data or instructions provided by the other primary 13 or tertiary 17 chains via the secure communication links 37. Optionally, such an electronic module for receiving data coming from other chains comprises an integrity verification device.

Relative to the CPU 45 of a primary computer 41, the CPU of a secondary computer 27 is a lower-performance processor, with low to medium power, for example, from the Texas® TMS 370/570 or Motorola® PowerQuick2Pro family.

If electrical flight commands are implemented, modules for computing these electrical flight commands (not shown) are optionally physically integrated into the secondary avionics computers 27.

Furthermore, the CPU of a secondary computer 27 (control COM or monitoring MON) is also connected to a secure electronic transmission module, configured to provide data delivered by the CPU to the other primary 13 or tertiary 17 chains via the secure communication links 37.

Within the secondary chain 15 shown in FIG. 4, the set of secondary computers 27 is configured to send the data to be retrieved to the crew via the secondary set 29 of electronic output modules.

In particular, according to a downgraded mode of the global pilot assistance system according to the described technology, the secondary chain 15 is able to process and partially retrieve, via the electronic output modules 29, pilot assistance information delivered according to the nominal mode by the primary chain 13. This is pilot assistance information essential to the safety of the flight, such as flight parameters, air/ground communication information, navigation and flight trajectory information, alerts, for example a stall alert, abnormal and emergency procedures.

The primary 13 and secondary 15 chains being technologically dissimilar, whether from a hardware or software perspective, the set of pilot assistance information is computed and retrieved differently from one chain to the other.

According to FIG. 4, to ensure avionics implementation redundancy, the secondary set 29 of electronic output modules for example comprises several secondary subsets 71 of identical electronic output modules.

Each secondary set 29 of electronic output modules comprises:

viewers, the number of which varies, for example, from one to four, the screen diagonal of which is preferably comprised between nine and twelve inches, or at least greater than or equal to six inches, and the technology of which is separate from those implemented in the primary chain 13. Such secondary viewers for example use OLED or LCD viewer technologies, and optionally include an infrared touch-sensitive designating device, and are optionally connected to, or incorporate, a pointing device, i.e., the cursor control device with buttons associated with four directions, and/or optionally actuators (control columns or levers for the automatic pilot function), and/or optionally, transmission devices, via data links toward other systems, i.e., the electrical flight controls.

The avionics functions performed by the secondary chain 15 are:

automatic pilot to maintain the altitude, speed, gradient, heading, route, or even to follow an approach gradient with a precision in categories 1, 2 or 3 with ILS (Instrument Landing System), GBAS (Ground-Based Augmentation Systems), SBAS (Satellite-Based Augmentation Systems) guiding, the secondary automatic pilot having an interface for entering a number of piloting instructions, by the crew, smaller than the number of instructions able to be entered in the primary chain 13. Such a secondary electronic entry module is in particular configured to allow a crew to modify a setpoint (received by the link 37) coming from another primary 13 or tertiary 17 chain, flight management and monitoring of a complex trajectory, made up of straight and semicircular segments, with time and fuel consumption predictions with low to medium precision (for example of about 1 minute to 5 minutes in arrival time, where the primary 13 or tertiary 17 chain will for example respectively yield less than one minute/around ten seconds), and/or determination of the closest diversion airports in instantaneous distance, and selected on the essential criteria of viability and safety. The combination of such automatic piloting and such flight management for example makes it possible to follow a RNP (Required Navigation Performance) trajectory below the 0.3 nm precision class, or even 0.1 nm, display of flight parameters and engines of the aircraft, alert generation in case of malfunction of the aircraft or in case of detection of at least one risk on the trajectory, management of air-ground communications, either via all or some of the air/ground communication modules associated with the primary chain 13, or via air/ground communication modules dedicated to the secondary chain 15.

adjustment of the secondary electronic output modules 71, for example, by using adjusting modules directly integrated in each electronic output module 71. In case of malfunction of the primary chain 13, the secondary chain 15 is reconfigurable to activate/deactivate its component electronic modules so as to select only the electronic modules that are necessary for piloting in this emergency situation.

Figure 5:
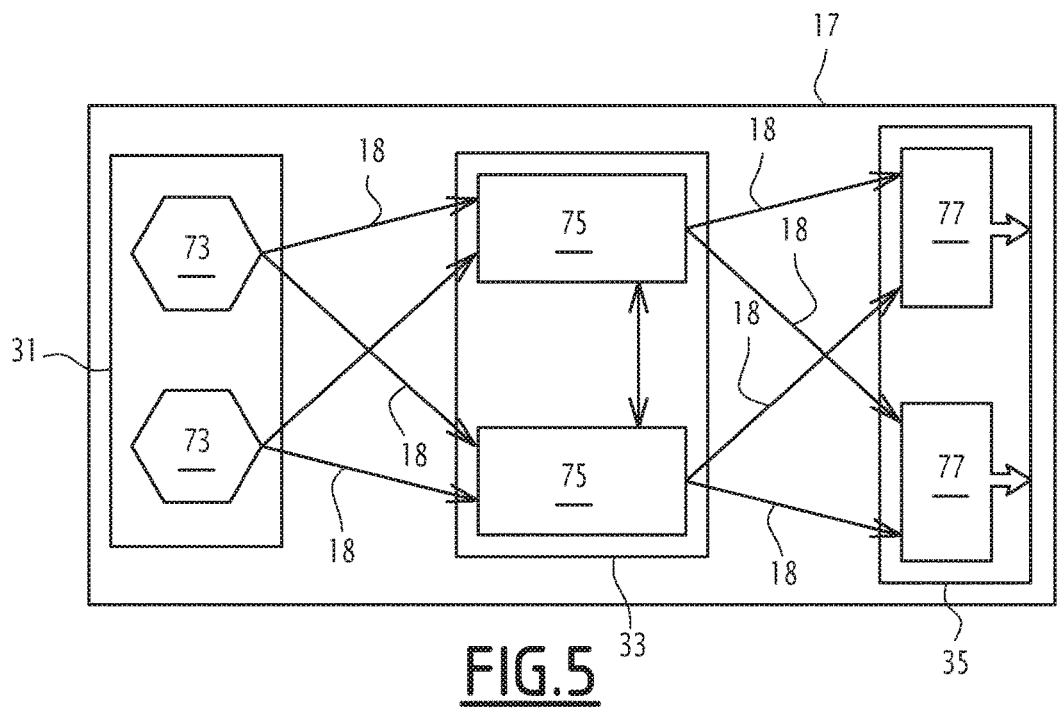
FIG. 5 is a schematic view of the tertiary chain of FIG. 1, FIGS. 6 to 10 are schematic views of various arrangements of display screens of the pilot assistance system of FIG. 1 in a cockpit of the aircraft.
Figure 6:
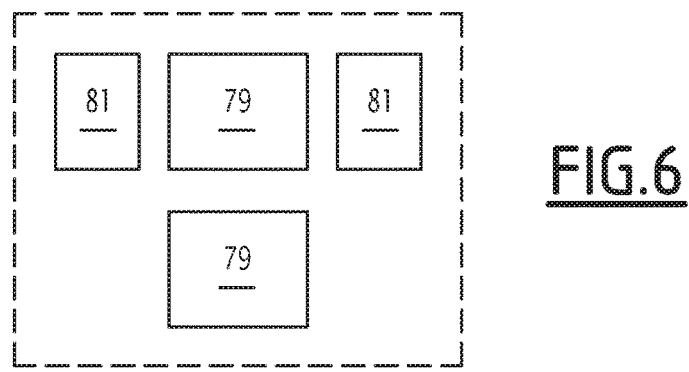
Figure 7:
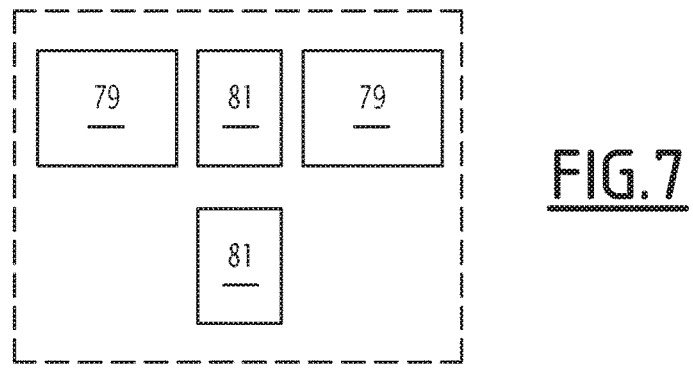
Figure 8:
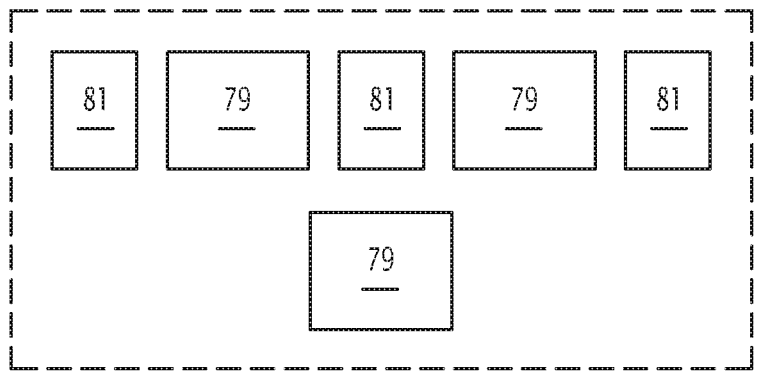
Figure 9:
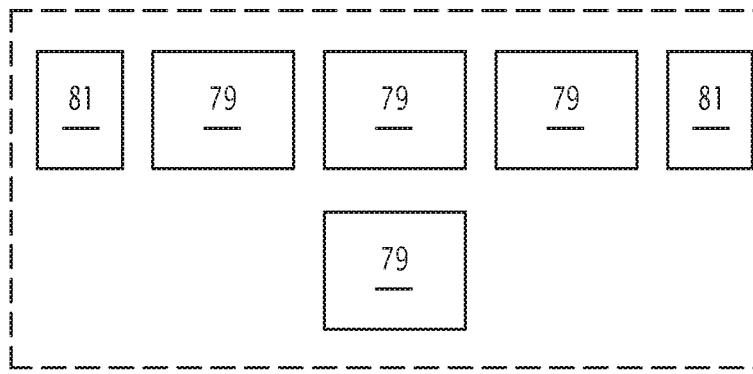
Figure 10:
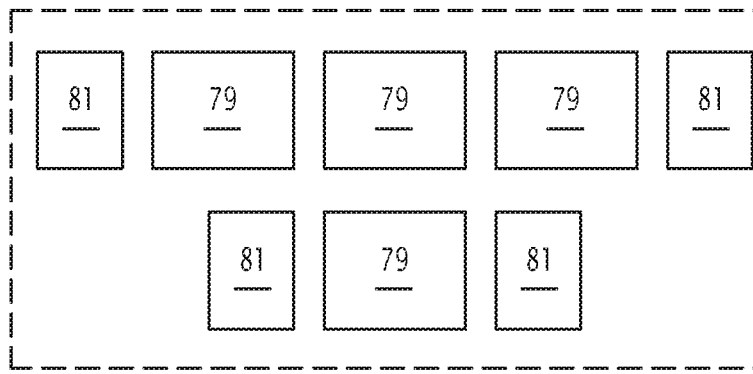

An example configuration of the tertiary chain 17 is outlined in FIG. 5.

The tertiary chain 17 is configured to implement, according to the enhancement mode, complex avionics functions to contribute to the effectiveness of the mission and the crew, without any effect on flight safety.

Each set 31 of input data receivers of the tertiary chain 17 comprises one or several devices or ports for receiving data transmitted by the primary 13 or secondary 15 chains via the secure communication links 37, transmitted via computing centers located on the ground and accessible via the ground/onboard communication modules or entered, using an entry interface, by the crew. In other words, aside from the tertiary receiving devices, the tertiary chain 17 does not necessarily have sensors dedicated to the avionics functions that it performs.

The set 31 of input data receivers of the tertiary chain 17 for example comprises several identical subsets 73 of input data receivers/receiving ports made redundant to ensure availability.

The set of tertiary input data receivers 31 is connected to the set of tertiary computers 33.

According to the example of FIG. 5, the set of tertiary computers 33 comprises two identical computers 75 in order to process the flight parameters provided by the two subsets of tertiary sensors 73, respectively. This redundancy is related to the greater or lesser operational need and not to a safety need of the tertiary functions.

The general structure of a tertiary computer 75 is identical to that of the computer of FIG. 3 described in relation to the primary chain 13, generally excluding the module 61 for local monitoring of the basic proper operation. The electronic modules (computing, memory, power supply, etc. components), making up a tertiary computer 75, are technologically separate (in terms of hardware design and/or in software design language) from the electronic modules making up a primary computer 41 or a secondary computer 27.

In particular, the tertiary chain 17 having no impact on flight safety, a tertiary computer for example comprises electronic components available to the general public with no integrity guarantee, but making it possible to benefit from the latest advances in computing.

According to the described technology, a tertiary computer 75 comprises a secure electronic transmission module, configured to provide data to the other primary 13 or secondary 15 chains via the secure communication links 37.

Within the tertiary chain 17 shown in FIG. 5, the set of tertiary computers 33 is configured to send the data to be retrieved to the crew via the tertiary set 35 of electronic output modules. In particular, the connection between the chains makes it possible to use the primary and secondary viewers to retrieve the tertiary information and, in certain implementations (not shown), no dedicated tertiary viewers are installed.

According to FIG. 5, to ensure avionics implementation redundancy, the tertiary set 35 of electronic output modules or viewers comprises two tertiary subsets 77 of identical electronic output modules corresponding to dedicated viewers, the viewers of the primary 13 and secondary 15 chains, or air/ground electronic communication modules.

In particular, according to the enhancement mode, the tertiary chain 17 is able to:

display noncritical pilot assistance information (in terms of effect on the flight safety): documentation, planning of the flight and operations, electronic messaging, administrative forms, monitoring cameras, etc.

implement avionics functions to optimize piloting comfort:

assist with the planning or replanning of the flight and mission by displaying a sequenced proposal of possible diversion airports, taking multiple criteria into account, seek out optimization in terms of time, fuel, passenger services by displaying a minute estimate of the consumption and time over the course of the flight (for example to within several seconds) or by proposing routes and flight profiles improving a combination of these time and consumption criteria, or others assist with maintenance, etc.

FIGS. 6 to 10 are schematic views of various arrangements of display screens of the pilot assistance system of FIG. 1 in a cockpit of the aircraft, the larger screens 79 being associated with the primary chain 13, while the smaller screens 81 with a diagonal greater than or equal to six inches are associated with the secondary chain 15.

The primary or secondary viewing screens are for example "head-down" screens corresponding to the conventional screens installed in the cockpit in direct view; semi-transparent fixed in the cockpit ("head-up"), or on the head or headset of the pilot ("worn") and making it possible to view synthetic images and the scene in direct view outside the airplane at the same time, for example. Other embodiments of the pilot assistance system can be considered.

In particular, the pilot assistance system of FIG. 1 is a non-limiting example embodiment. Assembly alternatives of a chain based on a grouping, in a same piece of physical equipment or in different, separate pieces of physical equipment, of sensor(s) and/or computer(s) and/or viewer(s) are for example implemented as an alternative. The GPU electronic module 49 with its graphic memory 51 of the primary computer is for example physically integrated into a viewer instead of being integrated into the primary computer 41.

Furthermore, according to another alternative, the distribution of the avionics functions respectively implemented by the primary chain 13 and by the secondary chain 15 are different from the embodiment described in connection with FIGS. 1 to 5. For example, the primary automatic pilot electronic module is able to implement the maximum landing capacities in particular without visibility, while the automatic pilot of the secondary chain is more limited and only able to implement landing capacities with intermediate visibility.

The optimized distribution according to the described technology, with or without duplication, of the various avionics functions over three primary 13, secondary 15 or tertiary 17 pilot assistance chains that are dissimilar in terms of hardware and/or software, and each associated with different criticality levels, makes it possible to lighten the primary chain in favor of:

a secondary chain with a maximum criticality level able to implement one to several monitoring pathways, and a tertiary chain for the optimization effort avionics functions with no effect on flight safety.

The design cost of the primary chain 13 is reduced by limiting its criticality level on the one hand, and by offloading complexity toward the tertiary on the other hand.

The secondary chain according to the described technology is, relative to the current standby chains, more comprehensive and able to implement the piloting and/or automatic navigation avionics functions with larger screens, allowing easier grasping and easy learning by the crew of the downgraded mode, with a better rendered service level.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. An aircraft pilot assistance system, comprising:
    at least one primary chain; and
    at least one secondary chain,
    each of the primary and secondary chains comprising a plurality of interconnected electronic modules, the primary and secondary chains differing from one another by at least one electronic module,
    each of the primary and secondary chains being configured to: retrieve pilot assistance information and implement at least one of the following avionics functions: automatic piloting,
        flight plan management and trajectory development, and
        alert generation in case of malfunction of the aircraft or in case of detection of at least one risk on the trajectory,
    the primary chain being configured to operate according to a nominal pilot assistance information retrieval mode, and
    the secondary chain being configured to operate according to a downgraded mode in which the information from the nominal mode is partially retrieved.

2. The pilot assistance system of claim 1, wherein the primary chain and the secondary chain are each associated with separate criticality levels, the secondary chain being associated with a more demanding criticality level than the criticality level associated with the primary chain.

3. The pilot assistance system of claim 1, wherein the secondary chain is configured to:
    be activated in case of malfunction of the primary chain, or
    operate in parallel with the primary chain.

4. The pilot assistance system of claim 1, wherein the size of the viewing screen(s) of the primary chain is equal to or larger than the size of the viewing screen(s) of the secondary chain, the screen diagonal(s) of the secondary chain being greater than or equal to six inches.

5. The pilot assistance system of claim 1, wherein, in each of the primary and secondary chains, at least one electronic module screen is touch-sensitive and/or is configured to be connected to a pointing device.

6. The pilot assistance system of claim 1, further comprising:
    a tertiary chain configured to operate according to a pilot assistance information retrieval enhancement mode comprising at least one additional item of pilot assistance information and separate from the pilot assistance information of the nominal mode or the downgraded mode, the primary, secondary and tertiary chains differing in pairs by at least one electronic module.

7. The pilot assistance system of claim 6, wherein at least two separate chains are configured to be connected by a secure communication link.

8. The pilot assistance system of claim 7, wherein one of the at least two chains configured to be connected by a secure communication link comprises an electronic module configured to execute a setpoint received from the other of the at least two chains.

9. The pilot assistance system of claim 8, wherein the secondary chain further comprises an electronic module for entering pilot instructions.

10. The pilot assistance system of claim 1, wherein at least one of the primary and secondary chains is reconfigurable in case of malfunction of another chain.

* * * * *